(12) United States Patent
Webster et al.

(10) Patent No.: US 8,520,984 B2
(45) Date of Patent: Aug. 27, 2013

(54) SILICON-BASED OPTICAL MODULATOR WITH IMPROVED EFFICIENCY AND CHIRP CONTROL

(75) Inventors: Mark Webster, Bethlehem, PA (US); Russell Romano, Allentown, PA (US); Kalpendu Shastri, Orefield, PA (US)

(73) Assignee: Cisco Technology, Inc., San Jose, CA (US)

( * ) Notice: Subject to any disclaimer, the term of this patent is extended or adjusted under 35 U.S.C. 154(b) by 323 days.

(21) Appl. No.: 12/781,471

(22) Filed: May 17, 2010

(65) Prior Publication Data

US 2010/0316324 A1    Dec. 16, 2010

Related U.S. Application Data

(60) Provisional application No. 61/186,693, filed on Jun. 12, 2009.

(51) Int. Cl.
   *G02F 1/035* (2006.01)
(52) U.S. Cl.
   USPC ............. 385/2; 385/1; 385/3; 385/40; 385/45
(58) Field of Classification Search
   None
   See application file for complete search history.

(56) References Cited

U.S. PATENT DOCUMENTS

| | | | |
|---|---|---|---|
| 4,983,531 A * | 1/1991 | Cosentino | 438/202 |
| 6,845,198 B2 | 1/2005 | Montgomery et al. | |
| 7,065,301 B2 | 6/2006 | Shastri et al. | |
| 7,088,875 B2 | 8/2006 | Sugiyama et al. | |
| 7,133,585 B2 | 11/2006 | Yegnanarayanan et al. | |
| 7,187,837 B2 * | 3/2007 | Gothoskar et al. | 385/131 |
| 7,217,584 B2 | 5/2007 | Yue et al. | |
| 7,289,686 B2 | 10/2007 | Sugiyama et al. | |
| 7,447,395 B2 | 11/2008 | Montgomery et al. | |
| 7,515,778 B2 | 4/2009 | Mosinskis et al. | |
| 2002/0131665 A1 | 9/2002 | Sriram et al. | |
| 2002/0154842 A1 | 10/2002 | Betts | |
| 2003/0147577 A1 | 8/2003 | Kataoka et al. | |
| 2003/0190107 A1 | 10/2003 | Walker | |
| 2005/0189591 A1 | 9/2005 | Gothoskar et al. | |
| 2005/0254743 A1 | 11/2005 | Akiyama et al. | |
| 2006/0120654 A1 | 6/2006 | Aoki et al. | |
| 2006/0120655 A1 | 6/2006 | Walker | |
| 2008/0088354 A1 * | 4/2008 | Mosinskis | 327/361 |
| 2009/0103850 A1 * | 4/2009 | Shastri et al. | 385/3 |
| 2009/0110342 A1 | 4/2009 | Webster et al. | |

OTHER PUBLICATIONS

Ye, Tong et al., "Chirp-Free Optical Modulation Using a Silicon Push-Pull Coupling Microring", Mar. 15, 2009 / vol. 34, No. 6 / Optics Letters.

(Continued)

*Primary Examiner* — Uyen Chau N Le
*Assistant Examiner* — Chad Smith
(74) *Attorney, Agent, or Firm* — Patterson & Sheridan, LLP (57) ABSTRACT

A silicon-based optical modulator exhibiting improved modulation efficiency and control of "chirp" (i.e., time-varying optical phase) is provided by separately biasing a selected, first region of the modulating device (e.g., the polysilicon region, defined as the common node). In particular, the common node is biased to shift the voltage swing of the silicon-based optical modulator into its accumulation region, which exhibits a larger change in phase as a function of applied voltage (larger OMA) and improved extinction ratio. The response in the accumulation region is also relatively linear, allowing for the chirp to be more easily controlled. The electrical modulation input signal (and its inverse) are applied as separate inputs to the second region (e.g., the SOI region) of each arm of the modulator.

19 Claims, 6 Drawing Sheets

(56) References Cited

OTHER PUBLICATIONS

Samara-Rubio et al., "A Gigahertz silicon-on-insulator Mach Zehnder modulator", Optical Fiber Communication Conference, 2004, IEEE, Feb. 23, 2004, the whole document.
Liu A et al., "Advances in silicon photonic devices for silicon-based optoelectronic applications", Physica E-Low Dimensional Systems and Nanostructures, Elsevier Science BV, NL, vol. 35, No. 2, Dec. 1, 2006, pp. 223-228, p. 224-226; p. 1, figures 1, 3, 5.
Betty, et al., "Zero Chirp 10 Gb/s MQW InP Mach Zehnder transmitter with full band tunability", Optical Fiber Communication Conference, OFCNFOEC 2007, Technical Digest IEEE, Piscataway, NJ, USA, Mar. 2007, pp. 179-181, the whole document.

* cited by examiner

SISCAP CROSS-SECTION

FIG. 4(c)

SISCAP EQUIVALENT CIRCUIT

SILICON-BASED OPTICAL MODULATOR WITH IMPROVED EFFICIENCY AND CHIRP CONTROL

CROSS-REFERENCE TO RELATED APPLICATIONS

This application claims the priority and benefit of U.S. Provisional Application No. 61/186,693 filed Jun. 12, 2009, which is herein incorporated by reference.

TECHNICAL FIELD

The present invention relates to a silicon-based optical modulator and, more particularly, to the ability to provide improved modulation efficiency and control of "chirp" (i.e., time-varying optical phase) in a silicon-based optical modulator by separately biasing one node of the device (e.g., the polysilicon region) to confine the modulator's voltage swing to the accumulation region of the silicon-based device.

BACKGROUND OF THE INVENTION

For many years, optical modulators have been made out of electro-optic material, such as lithium niobate. Optical waveguides are formed within the electro-optic material, with metal contact regions disposed on the surface of each waveguide arm. A continuous wave (CW) optical signal is launched into the waveguide, and an electrical data signal input is applied as an input to the metal contact regions. The applied electrical signal modifies the refractive index of the waveguide region underneath the contact, thus changing the speed of propagation along the waveguide. By applying the voltage(s) that produce a π phase shift between the two arms, a nonlinear (digital) Mach-Zehnder modulator is formed.

Although this type of external modulator has proven extremely useful, there is an increasing desire to form various optical components, subsystems and systems on silicon-based platforms. It is further desirable to integrate the various electronic components associated with such systems (for example, the input electrical data drive circuit for an electro-optic modulator) with the optical components on the same silicon substrate. Clearly, the use of lithium niobate-based optical devices in such a situation is not an option. Various other conventional electro-optic devices are similarly of a material (such as III-V compounds) that are not directly compatible with a silicon platform.

Figure 1:
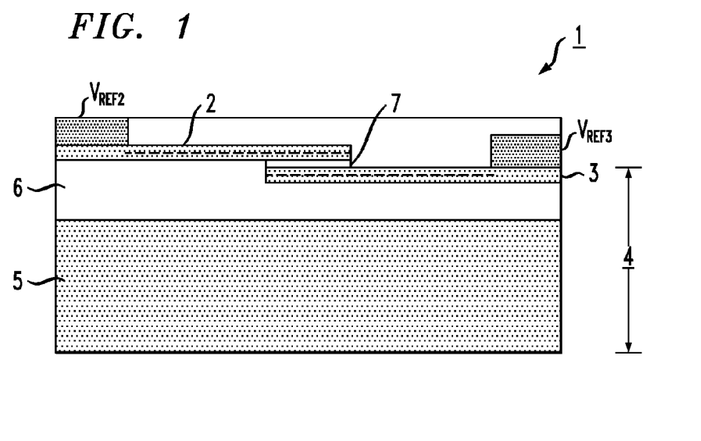
FIG. 1 is a side view of a prior art silicon-based optical device useful in providing modulation of an optical signal.

A significant advance has been made in the ability to provide optical modulation in a silicon-based platform, as disclosed in U.S. Pat. No. 6,845,198 issued to R. K. Montgomery et al. on Jan. 18, 2005, assigned to the assignee of this application and incorporated herein by reference. FIG. 1 illustrates one exemplary arrangement of a silicon-based modulator device as disclosed in the Montgomery et al. patent. In this case, silicon-based optical modulator 1 comprises a doped silicon layer 2 (typically, polysilicon) disposed in an overlapped arrangement with an oppositely-doped portion of a sub-micron thick silicon surface layer 3 (often referred to in the art as an SOI layer). SOI layer 3 is shown as the surface layer of a conventional silicon-on-insulator (SOI) structure 4, which further includes a silicon substrate 5 and a buried oxide layer 6. Importantly, a relatively thin dielectric layer 7 (such as, for example, silicon dioxide, silicon nitride, potassium oxide, bismuth oxide, hafnium oxide, or other high-dielectric-constant electrical insulating material) is disposed along the overlapped region between SOI layer 3 and doped polysilicon layer 2. The overlapped area defined by polysilicon layer 2, dielectric 7 and SOI layer 3 defines the "active region" of optical modulator 1. In one embodiment, polysilicon layer 2 may be p-doped and SOI layer 3 may be n-doped; the complementary doping arrangement (i.e., n-doped polysilicon layer 2 and p-doped SOI layer 3) may also be utilized.

Figure 2:
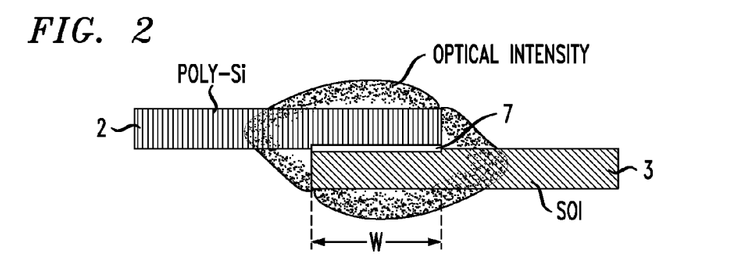
FIG. 2 is a view of an enlarged portion of the device of FIG. 1, showing the overlap configuration and associated active region of optical modulation.

FIG. 2 is an enlarged view of the active region of modulator 1, illustrating the optical intensity associated with a signal propagating through the structure (in a direction perpendicular to the paper) and also illustrating the width W of the overlap between polysilicon layer 2 and SOI layer 3. In operation, free carriers will accumulate and deplete on either side of dielectric 7 as a function of the voltages applied to SOI layer 3 and doped polysilicon layer 2. The modulation of the free carrier concentration results in changing the effective refractive index in the active region, thus introducing phase modulation of an optical signal propagating along a waveguide defined by the active region. In the diagram of FIG. 2, the optical signal will propagate along the y-axis, in the direction perpendicular to the paper.

While considered a significant advance in the state of the art over lithium niobate modulators, silicon-based optical modulators in general and the exemplary configuration of FIG. 1 in particular are known to suffer from chirp as a result of the inherent phase response and optical loss differences between the two arms of the modulator. Chirp is a time-varying optical phase that can be detrimental to the transmission behavior of an optical signal as it propagates through dispersive fiber. The chirp behavior of optical modulators is often characterized using an "alpha parameter" that is defined as the amount of phase modulation normalized to the amount of intensity modulation produced by the modulator. The alpha (α) parameter may be defined as follows:

$$\alpha = 2\frac{\frac{d\phi}{dt}}{\frac{1}{P}\frac{dP}{dt}}$$

and may exhibit a value that is zero, positive or negative. In some applications, it is desirable to have a small amount of negative chirp (i.e., a small negative alpha parameter) to extend the transmission distance of a signal along a dispersive medium, such as an optical fiber, before dispersion limits the range.

Conventional silicon-based optical modulators are known to exhibit non-zero chirp (even when configured in a symmetric drive arrangement) as a result of the nonlinear phase versus "applied voltage" response of their structure. Increasing either the modulation speed or the distance traveled by the modulated optical signal have been found to only exacerbate the chirp problem, since the dispersion characteristics of the transmission fiber will have an even greater impact.

Figure 3:
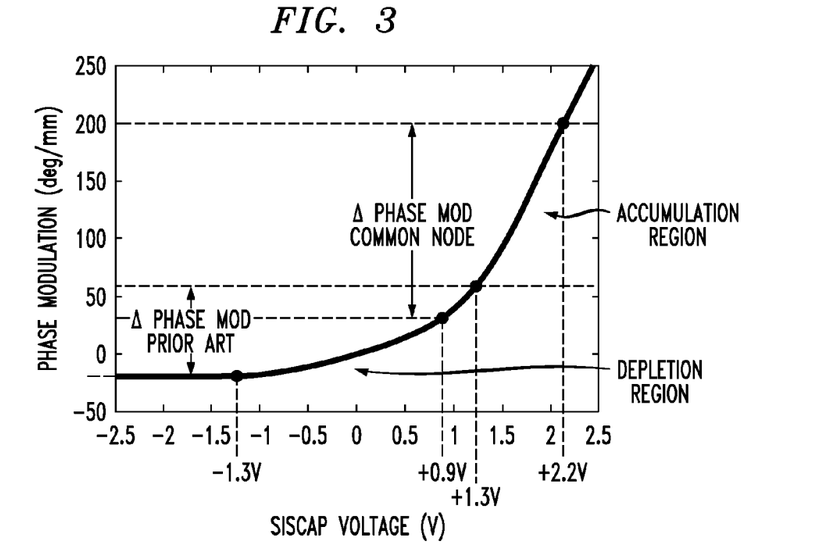
FIG. 3 is a plot of phase modulation as a function of applied voltage for the device of FIG. 1.

FIG. 3 is a plot of phase modulation of a silicon-based optical modulator as a function of applied voltage for the prior art device of FIG. 1. In a cross-coupled MZI arrangement utilizing this particular prior art device, the drive voltage is defined to swing between the values of −1.3 V and +1.3V (these values associated with the particulars of the electronics used as the driver circuit for the modulator), crossing from the depletion region of the modulating device into the accumulation region of the device. As shown, the change in phase modulation over the −/+1.3V range (Δ phase mod) is relatively small, due primarily to the relatively weak response in the depletion region of the device. This minimal phase change in the depletion region results in limiting the modulation efficiency of the prior art structure of FIG. 1. It is also to be understood that the voltage swing −/+1.3V is exemplary only and associated with certain design parameters; various other voltage ranges may also be employed in similar prior art devices.

Thus, a need remains in the art for a silicon-based optical modulator with improved modulation efficiency, extinction ratio and control of its chirp parameter.

SUMMARY OF THE INVENTION

The needs remaining in the prior art are addressed by the present invention, which relates to a silicon-based optical modulator and, more particularly, to the ability to provide improved modulation efficiency and control of "chirp" (i.e., time-varying optical phase) by applying the electrical data modulation signal to a first node of the device (e.g., the silicon (SOI) region of the modulator), while separately biasing a second node of the device (e.g., the polysilicon region of the modulator). In particular, the second node (also referred to hereinafter as the "common node") is biased to shift the voltage swing of the silicon-based optical modulator into its accumulation region of operation, which exhibits a larger (and more linear) change in phase as a function of applied voltage, resulting in a larger optical modulation amplitude (OMA) and improved extinction ratio.

In accordance with one embodiment of the present invention, the overlying polysilicon layer of a silicon-based optical modulator structure is defined as the common node and is held at a bias voltage different from the supply voltages ($V_{dd}$, $V_{ss}$) associated with the modulator. In this particular embodiment, the electrical data signal (and its inverse) are applied as separate inputs to the SOI layer of each arm of the modulator. By maintaining the polysilicon layer at a different bias voltage, the modulator's voltage swing is shifted into the accumulation region, which exhibits a more linear response, resulting in greater modulation efficiency (larger change in phase as a function of applied voltage), larger extinction ratio, and the ability to control the chirp of the device.

In an alternative embodiment, the SOI layer is defined as the "common node", with a negative-valued bias voltage applied to the SOI layer. In this case, the electrical data signal (and its inverse) are applied as separate inputs to the polysilicon layer of each arm of the modulator. The negative bias across the SOI layer will thus shift the operation of the modulator into the preferred accumulation region, as discussed above.

In yet another embodiment of the present invention, separate and different bias voltages are applied to the second node of each arm of the modulator (an asymmetric bias configuration). The use of separate bias voltages allows for additional chirp control by varying the relative phase delay experienced along each arm of the modulator.

In any embodiment, additional capacitance may be added between the separately-biased common node and the supply voltages to increase the de-coupling therebetween.

It is an advantage of the "common node" biasing arrangement of the present invention that the modulation efficiency, extinction ratio and chirp of the modulator are improved and better controlled (when compared to prior art silicon-based modulators) without needing to modify the standard supply voltages $V_{dd}$, $V_{ss}$ associated with the conventional electrical driver circuitry. That is, the performance of a silicon-based modulator with common-node biasing in accordance with the present invention is significantly improved over the prior art without needing to introduce changes or modifications to the standard circuitry associated with the modulator.

Other embodiments and advantages of the present invention will become apparent during the course of the following discussion and by reference to the accompanying drawings.

BRIEF DESCRIPTION OF THE DRAWINGS

Referring now to the drawings, where like numerals represent like parts in several views:

FIG. 6 is a simplified view of an MZI formed in accordance with the present invention, with FIG. 6(a) illustrating an embodiment of the present invention utilizing a separate voltage applied to the polysilicon layer of the silicon modulating device structure, and FIG. 6(b) illustrating an embodiment of the present invention utilizing a separate voltage applied to the SOI layer of the silicon modulating device structure;

DETAILED DESCRIPTION

Figure 4A:
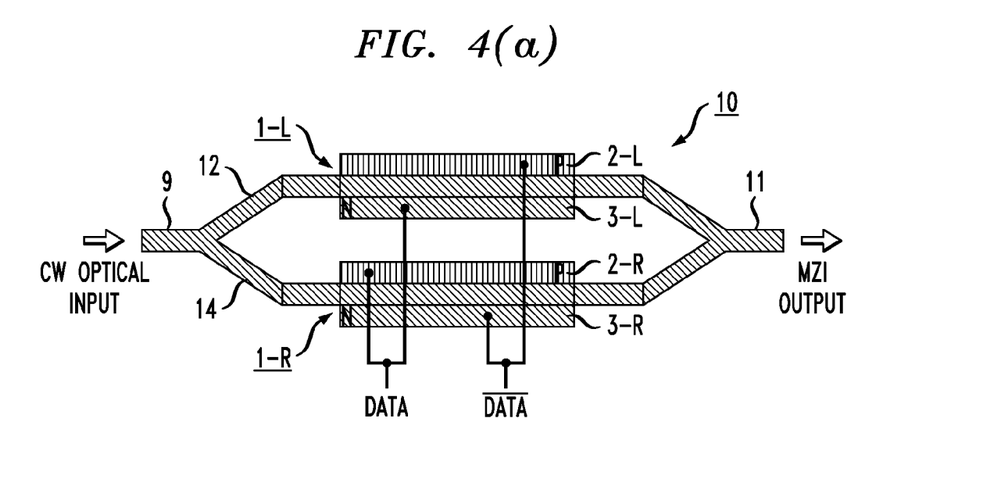
FIG. 4(a) is a simplified diagram of a prior art Mach Zehnder Interferometer (MZI) formed using a pair of silicon-based modulating devices as shown in FIG. 1.

Prior to describing the utilization of "common node" biasing for improved modulation efficiency and chirp control in a silicon-based optical modulator, it is considered helpful to provide an understanding of the operation of a prior art silicon-based optical modulator in greater detail. FIG. 4(a) is a simplified block diagram of an exemplary prior art Mach Zehnder Interferometer (MZI) 10 comprising an input waveguide section 9 that splits into a pair of separate, parallel waveguiding arms 12 and 14. The opposite ends of waveguiding arms 12 and 14 are thereafter re-combined to form an output waveguide section 11. As shown, waveguiding arms 12 and 14 each contain a silicon-based phase modulating device 1 as discussed above in association with FIG. 1. In particular, waveguiding arm 12 contains a modulating device 1-L (comprising a polysilicon region 2-L and SOI region 3-L), and waveguiding arm 14 contains a modulating device 1-R (comprising a polysilicon region 2-R and SOI region 3-R). Modulating devices 1-L and 1-R are controlled by the application of an electrical data input signal, as described above. In operation, a CW optical signal is introduced into input waveguide section 9 and will thereafter propagate along both arms 12 and 14, the output signals from arms 12 and 14 thereafter being re-combined along an output waveguide section 11. The electrical data signal inputs to modulating devices 1-L and 1-R create a phase change on the propagating optical signal, creating a modulated optical output signal along output waveguide section 11.

Figure 4B:
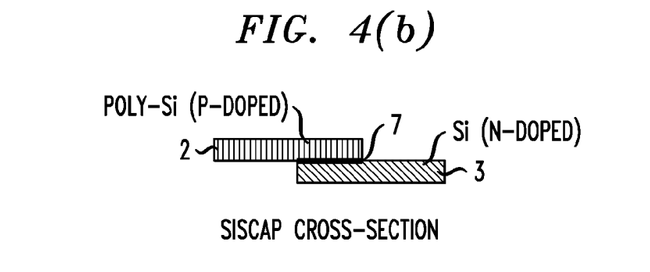
FIG. 4(b) is a simplified view of the overlap, optical active region of an exemplary silicon-based modulating device.
Figure 4C:
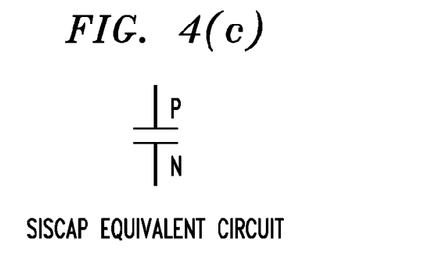
FIG. 4(c) is a schematic representation of the active region of FIG. 4(b)

A cross-section of an exemplary modulating device 1 is shown in FIG. 4(*b*) and its equivalent circuit is shown in FIG. 4(*c*), where for this example polysilicon layer 2 is defined as being a p-doped layer and SOI layer 3 is defined as being an n-doped layer (obviously, the complementary doping configuration may also be employed).

Figure 5:
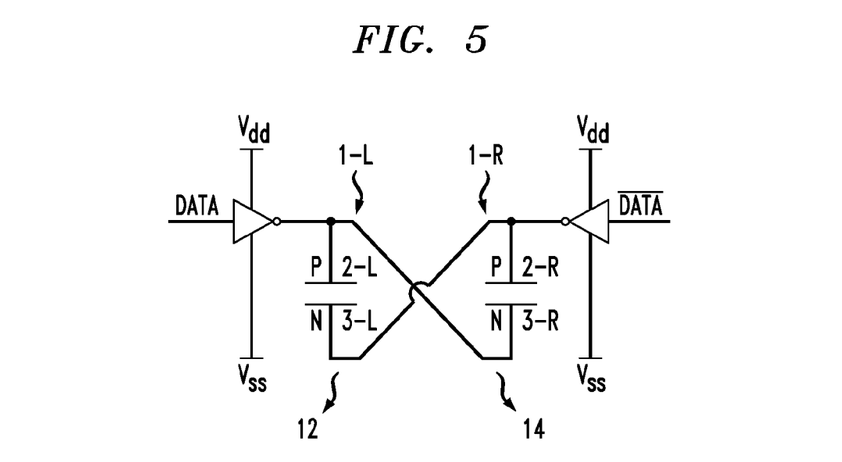
FIG. 5 is a schematic representation of the MZI of FIG. 4(a)

An exemplary operational configuration of prior art modulator 10 is as a "cross-coupled, push-pull" device as shown in a schematic representation in FIG. 5 (with reference also to FIG. 4). In this arrangement, an electrical DATA signal is applied to polysilicon region 2-L of device 1-L and also to SOI region 3-R of device 1-R. The complementary $\overline{\text{DATA}}$ signal is applied to the remaining pair of regions, namely SOI region 3-L and polysilicon region 2-R. In this configuration, therefore, the full voltage swing of $V_{dd}$-$V_{ss}$ is applied across each arm 12 and 14. Thus, if $V_{dd}$=1.3V and $V_{ss}$=0.0V (these voltages associated with a standard, conventional electrical driver circuit arrangement), the voltage across each modulating device 1-L and 1-R will be ±1.3V. This cross-coupled configuration offers a relatively low net equivalent capacitance, which is advantageous for device bandwidth.

However, the cross-coupled modulator arrangement of the prior art is not optimum, inasmuch as the optical phase change for silicon-based modulating devices 1-L and 1-R operating in the depletion mode (<0V) is not as great as when the device is operating in the accumulation mode (greater than about 0.9V for this particular arrangement), as seen in the plot of FIG. 3 and discussed above. Since the voltages of $V_{ss}$ and $V_{dd}$ are typically fixed for most commercial devices, this particular nonlinear behavior of the modulating device when operating in the depletion mode is problematic, yielding a relatively low modulation efficiency and a chirp that is fixed in value.

The limitations associated with the cross-coupled modulator arrangement of the prior art are addressed by the present invention, which separately biases a selected common node in the silicon-based modulator structure, thus shifting the operating region of the modulator into the more linear accumulation region, which increases the phase change as a function of applied voltage. In one embodiment, the polysilicon layer is defined as the common node and biased with a positive voltage to shift the modulating function into the accumulation region of the device. In an alternative embodiment, the SOI layer is defined as the common node and biased with a negative voltage that will similarly shift the modulating function into the preferred accumulation region. By operating solely in the accumulation region, the OMA and extinction ratio is greatly increased, while the ability to control the voltage applied to the polysilicon regions allows for control and adjustment of the chirp exhibited by the modulator.

Figure 6A:
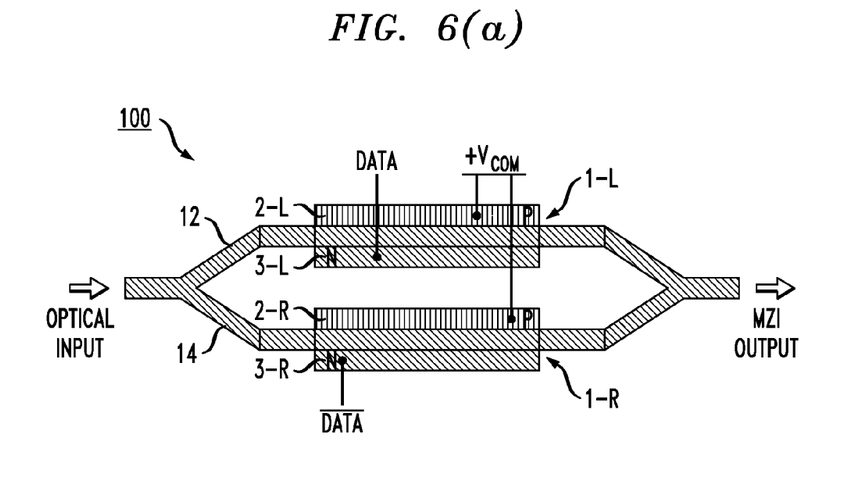
Figure 7A:
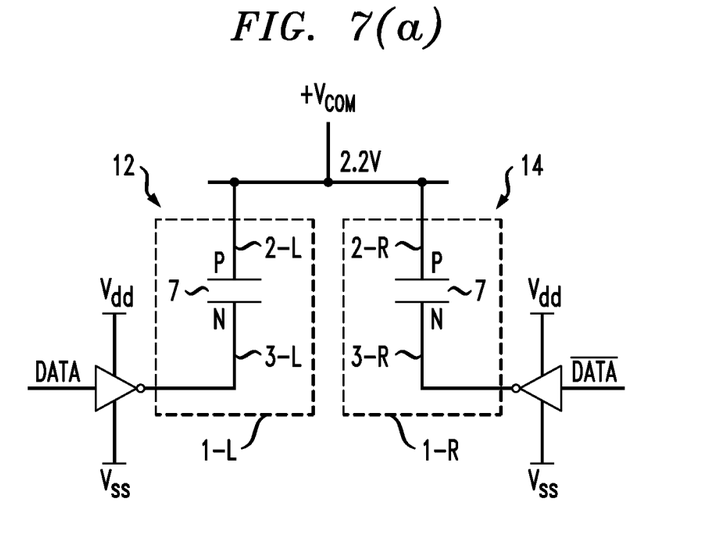
FIG. 7(a) is a schematic representation of the MZI of FIG. 6(a)

FIG. 6(*a*) illustrates a first embodiment of a silicon-based optical modulator 100 formed in accordance with the present invention, where similar reference numerals are used to define the same regions as discussed above with the prior art arrangement. FIG. 7(*a*) is a schematic equivalent of the arrangement of FIG. 6(*a*). Referring to both FIGS. 6(*a*) and 7(*a*), it is shown that the common node is defined by polysilicon regions 2-L and 2-R, which are coupled together and held at a predetermined (positive) voltage+$V_{com}$. The electrical data signal (shown as DATA in the drawings) is applied as the modulating input to SOI region 3-L, with the complement signal $\overline{\text{DATA}}$ applied as the input to SOI region 3-R. This configuration then places the voltages of ($V_{com}$-$V_{dd}$) and ($V_{com}$-$V_{ss}$) across each arm 12 and 14 of optical modulator 100 (see FIG. 7(*a*)). In one exemplary arrangement, the voltages may be $V_{com}$=+2.2V, $V_{ss}$=0.0 and $V_{dd}$=+1.3, thus providing for the voltage across modulating devices 1-L and 1-R to be either 0.9V or 2.2V.

Figure 6B:
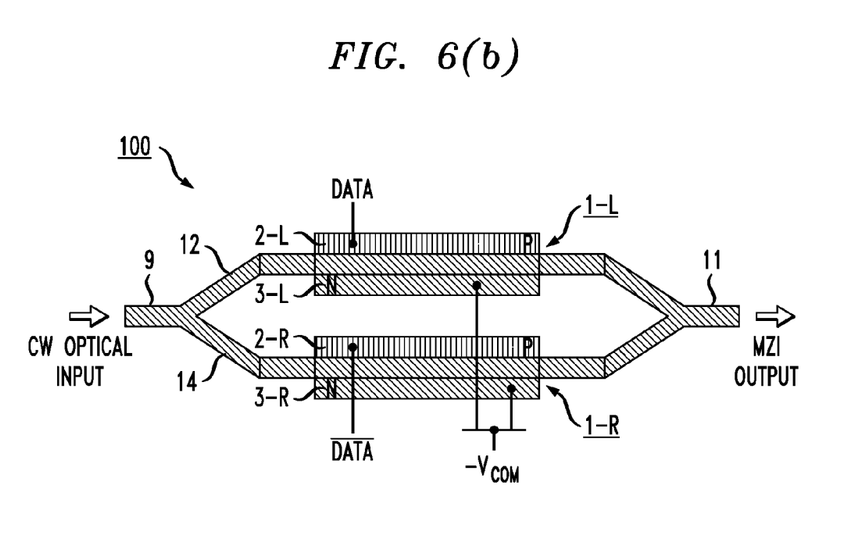
Figure 7B:
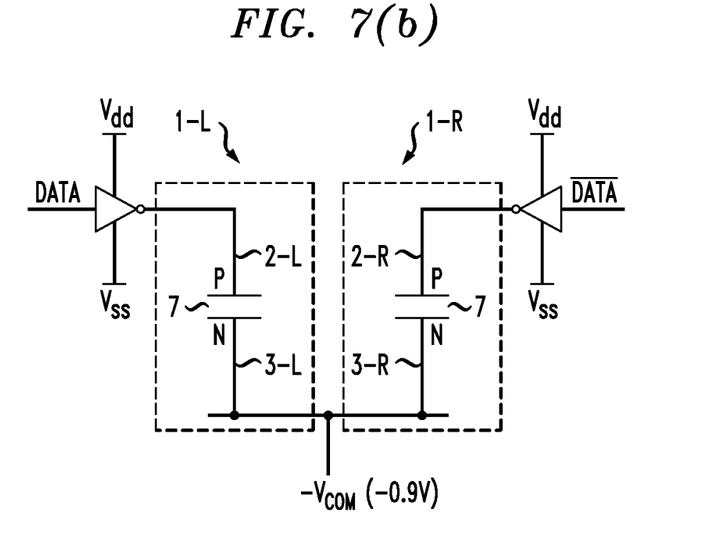
FIG. 7(b) is a schematic representation of the MZI of FIG. 6(b)

FIG. 6(*b*) illustrates a complementary form of this first embodiment, where SOI regions 3-L and 3-R are defined as the common node, coupled together and biased at a predetermined (negative) voltage-$V_{com}$. In this case, the modulating signal DATA is applied as an input to polysilicon region 2-L and its complement ($\overline{\text{DATA}}$) coupled to polysilicon region 2-R. FIG. 7(*b*) shows the schematic version of this complementary form, where the application of a negative bias voltage at SOI regions 3-L and 3-R will also shift the operation of the modulating function into the accumulation region of the device. In the case of $V_{com}$=-0.9V, with the same $V_{dd}$ and $V_{ss}$ values as discussed above in association with FIG. 6(*a*), the voltage swing across modulating devices 1-L and 1-R will again be either 0.9V or 2.2V.

Obviously, these specific voltages are exemplary only, where various other values for $V_{dd}$ and $V_{ss}$ may be utilized, as a function of the specific electronic drive circuitry being employed. The magnitude of $V_{com}$ needs to remain less than the breakdown voltage of the dielectric material of the modulating device (layer 7), but may be selected (and modified, as discussed below) for a specific application. A positive voltage for $V_{com}$ is used when biasing the polysilicon regions, whereas a negative voltage for $V_{com}$ is used when biasing the SOI regions in the modulating device of the present invention.

FIG. 3 also illustrates the operation range of the device of the present invention, in this case illustrating the phase modulation created between the exemplary values of 0.9V and 2.2. V discussed above in association with the embodiments of FIGS. 6(*a*) and (*b*). As shown, the common node biasing of the present invention functions to confine the operation of a silicon-based optical modulator to its accumulation region. Compared with the prior art voltage arrangement, the "common node" arrangement of modulator 100 of the present invention offers a greater modulation efficiency, with a larger change in phase modulation across the linear response of the accumulation region for the same supply voltages $V_{dd}$, $V_{ss}$.

Figure 8:
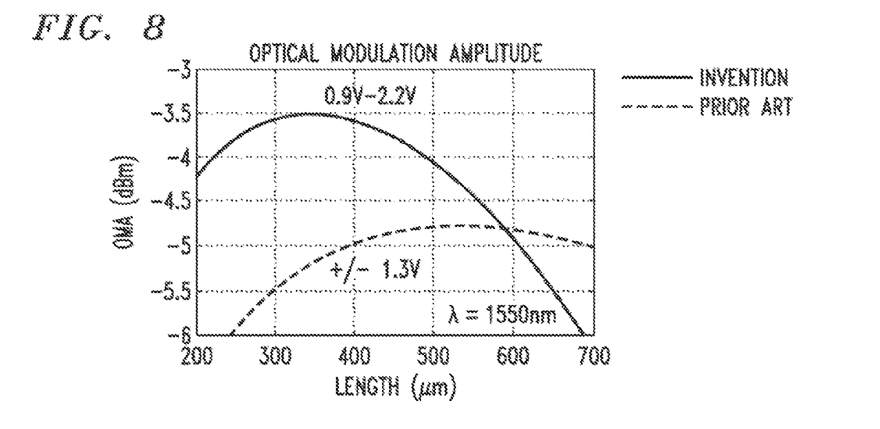
FIG. 8 is a plot comparing the optical modulating amplitude (OMA) of a prior art device to the device of the present invention.

Indeed, the arrangement of the present invention provides a larger optical modulation amplitude (OMA) and extinction ratio for the same power supply values than could be obtained from prior art configurations. The OMA is defined as the difference between the optical power levels when generating an optical "1" (defined as power level $P_1$) and an optical "0" (defined as power level $P_0$) and can be expressed as $P_1$-$P_0$. FIG. 8 is a plot comparing the OMA values for the prior art arrangement of FIG. 4 and the "common node" inventive configuration as shown in FIGS. 6(*a*) and (*b*). The OMA is shown as a function of the length/of optical modulating device 1. The values shown in FIG. 8 were created for an exemplary operating wavelength of 1550 nm and clearly show that the OMA for the arrangement of the present invention is significantly greater than that of the prior art for modulating devices having a length in the range of 200-600 µm, as a result of operating in the accumulation region of the silicon-based optical modulating device. The wavelength of 1550 nm is solely for the purposes of explanation, since the modulating device of the present invention is capable of operating with incoming optical signals at any suitable wavelength (e.g., wavelengths greater than 1100 nm); similarly, the length/of the device can be any suitable value, based on the engineering parameters of the device.

Figure 9:
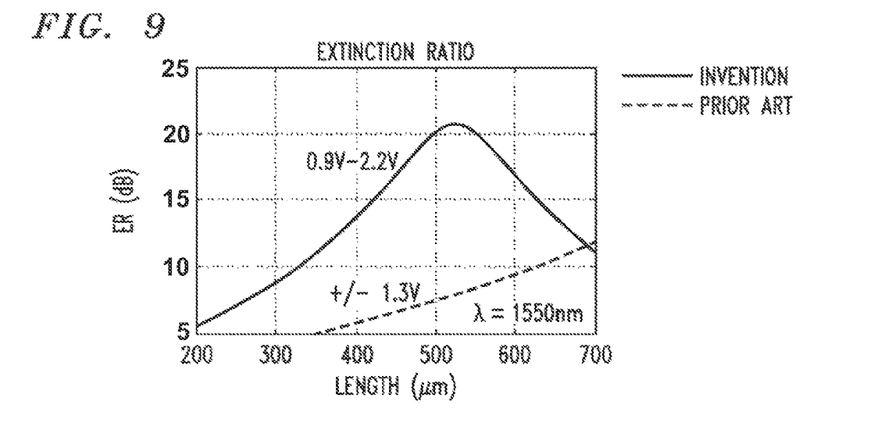
FIG. 9 is a plot comparing the extinction ratio of a prior art device to the device of the present invention.

The extinction ratio associated with the device of the present invention is also improved over that of the prior art, as shown in the plot of FIG. 9. The extinction ratio can be defined as the ratio of the powers defined above, that is the ratio $P_1/P_0$, and is also plotted in FIG. 9 as a function of the length/of modulating device 1. It is generally desirable to have as large an extinction ratio as possible so as to minimize the bit error rate (BER) of the modulator. As shown, the extinction ratio associated with the configuration of the present invention is significantly larger than that of the prior art for a device length l in the range of 200-700 µm. For example, at a length of 400 µm, a prior art modulator exhibits an extinction ratio on the order of about 7 dB, while a "common node" modulator of the present invention will exhibit an extinction ratio of about 13 dB. Increasing the length to about 500 µm allows for the extinction ratio of the inventive arrangement to increase to over 20 dB (the prior art having an extinction ratio for this length of about 8 dB). Seemingly small improvements in the extinction ratio can make a relatively large difference in the power required to maintain a constant BER.

Even though the embodiments of the present invention as shown in FIGS. 6 and 7 are still symmetric, push-pull configurations, they will exhibit reduced chirp when compared to the prior art, since the phase modulation behavior is more linear in the 0.9-2.2V range (see FIG. 3).

In another arrangement of the embodiments of FIGS. 6 and 7, the voltage $V_{com}$ may be adjustable so as to tune or control one or more of the OMA, extinction ratio and chirp behavior. Indeed, any voltage up to the breakdown voltage of dielectric layer 7 (see FIG. 1) may be utilized to successfully bias the common node regions of the modulating devices and thus tune/control the OMA, extinction ratio or exhibited chirp to a desired magnitude and value. In a first configuration of this other arrangement, the voltage $V_{com}$ may be "tuned" during manufacture to select an optimum value, and then set to retain that value (as a function, for example, of the specific physical dimensions of the modulating device). Alternatively, another configuration of a tunable arrangement allows for the voltage $V_{com}$ to be continuously adjusted (tuned) over the lifetime of the modulating device, where it may be desirable to modify the common node bias voltage as a function of the operating conditions (e.g., optical signal wavelength, optical link budget of the overall system, power supply voltage levels, environmental conditions, aging conditions, etc.) in order to provide the desired degree of chirp for a particular situation. Indeed, as mentioned above, different applications may require a different amount of chirp (in terms of both magnitude and sign) and the ability to adjust the OMA, extinction ratio and/or chirp for each application is considered to be a significant advantage of the present invention.

Figure 10:
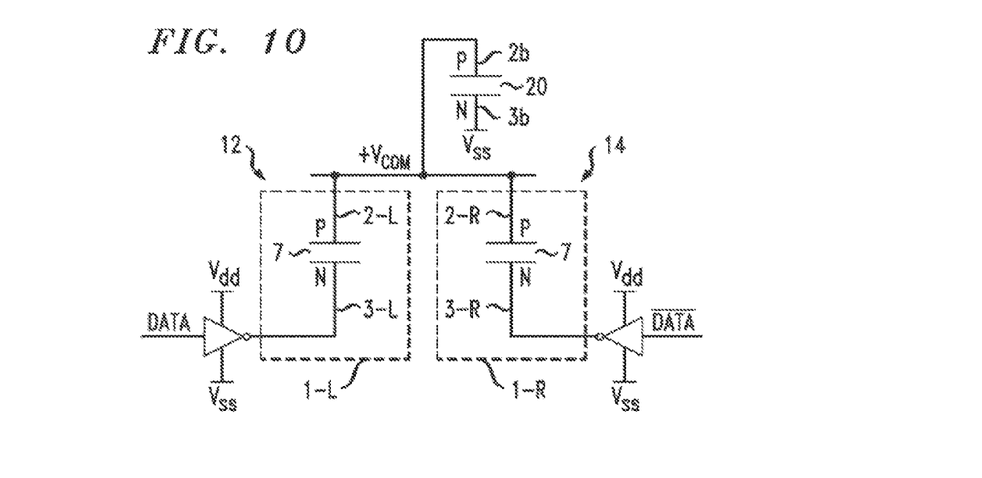
FIG. 10 is a schematic representation of another arrangement of the embodiment of FIG. 6(a), in this case incorporating bypass capacitance between the polysilicon layer and ground potential of the MZI structure.

Improved electrical performance over the arrangements of FIG. 6 can be achieved by providing extra capacitance between the voltages $V_{com}$ and $V_{ss}$, mitigating the effects of series resistance and inductance when modulator 100 changes state by switching the applied voltages. FIG. 10 is a schematic representation of this configuration of the embodiment of FIG. 6(a), with an additional bypass capacitor 20 created between $+V_{com}$ and $V_{ss}$. Advantageously, this capacitance may be directly created within the SOI structure, comprising a section of doped polysilicon 2-B, dielectric 7 and a doped section of SOI layer 3-B, and is ideally placed in close proximity to the MZI structure of modulator 100. Alternatively, other materials may be used to form bypass capacitor 20 as an integrated structure with modulator 100, or in yet another embodiment, a discrete capacitive device may be used.

Figure 11:
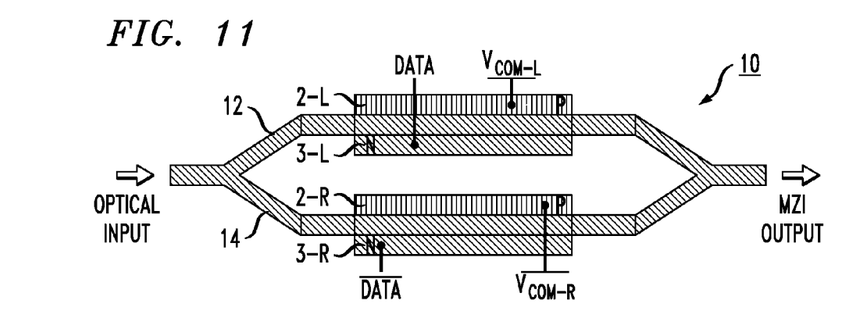
FIG. 11 is a simplified view of an alternative embodiment of the present invention, in this case utilizing separate voltage sources to bias the common node (in this case, polysilicon region) of each arm of the MZI structure.
Figure 12:
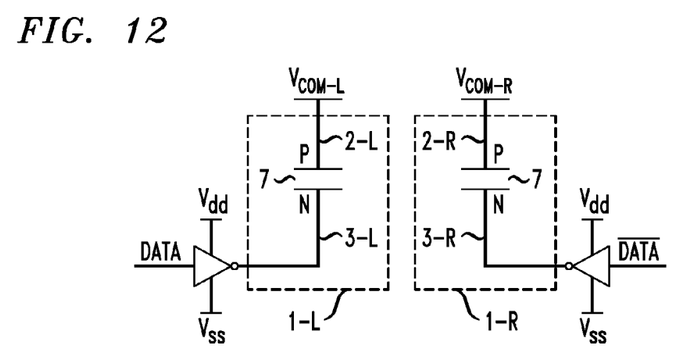
FIG. 12 is a schematic representation of the embodiment of FIG. 11.

Another embodiment of the present invention, referred to as an asymmetric embodiment, is illustrated in FIG. 11, with its schematic representation shown in FIG. 12. In this embodiment, the polysilicon layer is used as the "common node", with a separate bias voltage applied to the polysilicon layer of each arm 12, 14 of modulator 100. As shown, a voltage $V_{com-L}$ is applied to polysilicon region 2-L of modulating device 1-L disposed along arm 12 of modulator 100. A separate voltage $V_{com-R}$ is applied to polysilicon region 2-R of modulating device 1-R disposed along arm 14 of modulator 100. While the voltages $V_{com-L}$ and $V_{com-R}$ may be equal, it is more likely that they are slightly different, creating an asymmetric configuration. As a result, arms 12 and 14 of modulator 100 will have different phase modulation efficiencies, which induces greater modulator chirp. The sign and behavior of the chirp can therefore be controlled by independently adjusting the voltages $V_{com-L}$ and $V_{com-R}$, and can also be controlled by changing the quadrature biasing point of the modulator from +90° to −90°.

Figure 13:
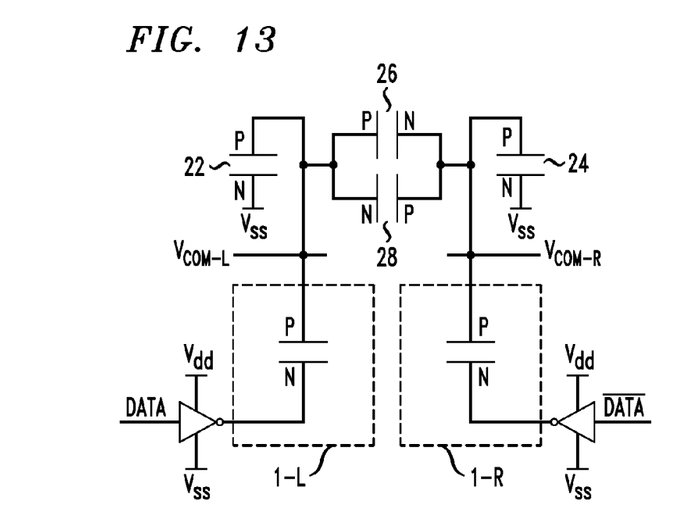
FIG. 13 is a schematic of another arrangement of the embodiment of FIG. 11, in this case incorporating bypass capacitance into the arrangement.

As with the symmetric configuration, the asymmetric arrangement of FIG. 11 can be modified to include bypass capacitance, where in this case a pair of bypass capacitors 22 and 24 may be utilized, as shown in the arrangement of FIG. 13 (it is to be understood that it is also possible to use only a single bypass capacitor in this asymmetric arrangement). Additionally, capacitance may be inserted between each polysilicon region, shown as devices 26, 28 in FIG.

It is to be understood that there are various other silicon-based optical modulator arrangements that may benefit by the use of a common node bias voltage control to increase modulation efficiency, large extinction ratio and control chirp. For example, there are configurations of silicon-based optical modulators that include separate regions for providing "DC tuning" of the modulator's bias value (using a thermal element, for example), as disclosed in U.S. Pat. No. 7,447,395 issued on Nov. 4, 2008 and herein incorporated by reference. Configurations utilizing a corrugated active region to increase the optical path length (as disclosed in U.S. Pat. No. 7,549,358, issued on May 26, 2009 and incorporated by reference) or multi-level signaling (see U.S. Pat. No. 7,483,597, issued on Jan. 27, 2009 and incorporated by reference) are also considered to benefit from the use of separate bias and control of the polysilicon regions of the modulating device structure.

As other embodiments of the invention will occur to those skilled in the art, the scope of the present invention is to be defined by the terms of the following claims and recognized equivalents. For example, the p-type doping of the polysilicon layer and the n-type doping of the SOI layer may be interchanged, with the appropriate reversals in the applied voltages. Other modifications in terms of the specific value of the applied polysilicon bias voltage(s), and the ability to tune these voltages are also considered to fall within the scope of the present invention as defined by the claims appended hereto.

What is claimed is:

1. A silicon-based optical modulator comprising:
an input optical waveguide splitter, responsive to an incoming continuous wave optical signal;

a pair of optical waveguide arms, each waveguide arm coupled to a separate output from the input optical waveguide splitter, and each optical waveguide arm including a silicon-based modulating device comprising a first silicon region having dopants consisting of a first conductivity type and a second silicon region having dopants consisting of a second conductivity type, with an electrical modulating data signal applied to the silicon-based modulating device along each optical waveguide arm to create a modulated optical signal; and an output optical waveguide combiner, coupled to the outputs of the pair of optical waveguide arms to combine the pair of separately modulated optical signals and create an optically modulated output signal, wherein one of the first silicon regions of the modulating devices is coupled to receive the electrical modulating data signal and a second, remaining one of the first silicon regions of the modulating devices is coupled to receive a complementary version of the electrical modulating data signal, and the second silicon regions of the silicon-based modulating devices are held at a predetermined bias voltage selected to provide operation of the silicon-based modulating devices in an accumulation region of operation.

2. A silicon-based optical modulator as defined in claim 1 wherein the second silicon regions are held at the same predetermined bias voltage.

3. A silicon-based optical modulator as defined in claim 2 wherein the predetermined bias voltage is tunable to adjust the amount of chirp in the optically modulated output signal.

4. A silicon-based optical modulator as defined in claim 3 wherein the predetermined bias voltage is tunable at the time of manufacture to provide a predetermined amount of chirp.

5. A silicon-based optical modulator as defined in claim 3 wherein the predetermined bias voltage is continuously tunable during the operating of the optical modulator to continuously modify the amount of chirp, as necessary.

6. A silicon-based optical modulator as defined in claim 2 wherein the predetermined bias voltage is tunable to adjust the optical modulation amplitude in the optically modulated output signal.

7. A silicon-based optical modulator as defined in claim 6 wherein the predetermined bias voltage is tunable at the time of manufacture to provide a predetermined optical modulation amplitude.

8. A silicon-based optical modulator as defined in claim 6 wherein the predetermined bias voltage is continuously tunable during the operating of the optical modulator to continuously modify the optical modulation amplitude, as necessary.

9. A silicon-based optical modulator as defined in claim 2 wherein the predetermined bias voltage is tunable to adjust the extinction ratio in the optically modulated output signal.

10. A silicon-based optical modulator as defined in claim 9 wherein the predetermined bias voltage is tunable at the time of manufacture to provide a predetermined extinction ratio.

11. A silicon-based optical modulator as defined in claim 9 wherein the predetermined bias voltage is continuously tunable during the operating of the optical modulator to continuously modify the extinction ratio, as necessary.

12. A silicon-based optical modulator as defined in claim 2 wherein the modulator further comprises a bypass capacitor disposed between the predetermined bias voltage and the electrical modulating data signal to provide de-coupling therebetween.

13. A silicon-based optical modulator as defined in claim 1 wherein the second silicon regions are held at separate, predetermined bias voltages.

14. A silicon-based optical modulator as defined in claim 13 wherein the separate, predetermined bias voltages applied to the second silicon regions are separately tunable.

15. A silicon-based optical modulator as defined in claim 13 wherein the modulator further comprises a pair of bypass capacitors, each coupled between a second silicon region predetermined bias voltage and the associated electrical modulating data signal.

16. A silicon-based optical modulator as defined in claim 1 wherein each silicon-based modulating device comprises a silicon-on-insulator (SOI)-based modulator including a surface silicon waveguiding SOI layer disposed over an insulating layer covering a silicon substrate, a thin gate dielectric layer formed over a top surface of the SOI layer, and a polysilicon layer disposed over a portion of the thin gate dielectric layer to form an overlapped area with the SOI layer, the overlapped area defining an active region of the silicon-based modulating device for supporting the modulation of a propagating optical signal.

17. A silicon-based optical modulator as defined in claim 16 wherein the polysilicon layers of each modulating device are defined as the first silicon regions and the SOI layers of each modulating device are defined as the second silicon regions.

18. A silicon-based optical modulator as defined in claim 16 wherein the SOI layers of each modulating device are defined as the first silicon regions and the polysilicon layers of each modulating device are defined as the second silicon regions.

19. A silicon-based optical modulator as defined in claim 16 wherein the thin gate dielectric layer comprises a material selected from the group consisting of: silicon dioxide, silicon nitride, potassium oxide, bismuth oxide and hafnium oxide.

* * * * *

UNITED STATES PATENT AND TRADEMARK OFFICE
CERTIFICATE OF CORRECTION

PATENT NO. : 8,520,984 B2  
APPLICATION NO. : 12/781471  
DATED : August 27, 2013  
INVENTOR(S) : Webster et al.

Page 1 of 1

It is certified that error appears in the above-identified patent and that said Letters Patent is hereby corrected as shown below:

In the Specification,

In Detailed Description:

Column 6, Line 63, please delete "length/of" and insert --length $\ell$ of-- therefor;

Column 7, Line 7, please delete "length/of" and insert --length $\ell$ of-- therefor;

Column 7, Line 15, please delete "length/of" and insert --length $\ell$ of-- therefor;

Column 7, Line 20, please delete "length 1" and insert --length $\ell$-- therefor.

Signed and Sealed this  
Twelfth Day of November, 2013

Teresa Stanek Rea  
*Deputy Director of the United States Patent and Trademark Office*